(12) United States Patent
Howland et al.

(10) Patent No.: US 11,325,326 B2
(45) Date of Patent: May 10, 2022

(54) PROCESS FOR MANUFACTURING A FIBER REINFORCED COMPOSITE ARTICLE, THE COMPOSITE ARTICLE OBTAINED AND THE USE THEREOF

(71) Applicant: Huntsman International LLC, The Woodlands, TX (US)

(72) Inventors: Duncan Howland, Hesingue (FR); Stephan Costantino, Saint-Louis (FR); Klaus Ritter, Weil am Rhein (DE); Guillaume Dirrig, Kingersheim (FR)

(73) Assignee: Huntsman International LLC, The Woodlands, TX (US)

( * ) Notice: Subject to any disclaimer, the term of this patent is extended or adjusted under 35 U.S.C. 154(b) by 334 days.

(21) Appl. No.: 15/553,617

(22) PCT Filed: Feb. 4, 2016

(86) PCT No.: PCT/EP2016/052330
§ 371 (c)(1),
(2) Date: Aug. 25, 2017

(87) PCT Pub. No.: WO2016/134937
PCT Pub. Date: Sep. 1, 2016

(65) Prior Publication Data
US 2018/0029315 A1    Feb. 1, 2018

(30) Foreign Application Priority Data
Feb. 27, 2015    (EP) .................................... 15156848

(51) Int. Cl.
*B29C 70/48* (2006.01)
*B29C 37/00* (2006.01)
*B29C 43/36* (2006.01)
*B29C 33/00* (2006.01)
*B29C 70/46* (2006.01)
(Continued)

(52) U.S. Cl.
CPC .......... *B29C 70/48* (2013.01); *B29C 33/0038* (2013.01); *B29C 37/0064* (2013.01); *B29C 43/3607* (2013.01); *B29C 70/467* (2013.01); *B29C 33/10* (2013.01);
(Continued)

(58) Field of Classification Search
None
See application file for complete search history.

(56) References Cited

U.S. PATENT DOCUMENTS 4,251,594 A    2/1981  Davis et al.
4,323,623 A *  4/1982  Ahrens ................. B29C 70/025
                                                      442/267
(Continued)

FOREIGN PATENT DOCUMENTS

JP    H07256673 A    10/1995
JP    2006341536 A    12/2006
(Continued)

*Primary Examiner* — Monica A Huson (57) ABSTRACT

A process for the preparation of a fiber reinforced composite article that facilitates manufacturing of composite articles with reduced cycle times, said composite articles exhibiting high fibre content, low void content and excellent visual and mechanical properties, and capable of use for the construction of mass transportation vehicles, in particular, in the automotive and aerospace industries.

11 Claims, 2 Drawing Sheets

(51) Int. Cl.
  *B29L 31/30* (2006.01)
  *B29C 33/10* (2006.01)
  *B29K 301/10* (2006.01)
  *B29K 63/00* (2006.01)

(52) U.S. Cl.
  CPC ...... *B29K 2063/00* (2013.01); *B29K 2301/10* (2013.01); *B29L 2031/3005* (2013.01)

(56) References Cited

U.S. PATENT DOCUMENTS

| | | |
|---|---|---|
| 4,551,085 A | 11/1985 | Epel et al. |
| 4,661,568 A | 4/1987 | Koenig et al. |
| 4,713,137 A | 12/1987 | Sexton |
| 4,868,059 A | 9/1989 | Walker et al. |
| 2004/0188883 A1* | 9/2004 | Barron ................ B29C 70/305 264/258 |
| 2006/0220273 A1 | 10/2006 | Armstrong et al. |
| 2008/0185757 A1 | 8/2008 | Takano et al. |
| 2014/0061980 A1 | 3/2014 | Kobayashi et al. |
| 2014/0138872 A1* | 5/2014 | Hattori ............. B29C 45/14631 264/250 |
| 2015/0017853 A1 | 1/2015 | Perillat-Collomb et al. |
| 2015/0290842 A1 | 10/2015 | Graf |
| 2015/0360425 A1 | 12/2015 | Guha et al. |

FOREIGN PATENT DOCUMENTS

| | | |
|---|---|---|
| JP | 2013022835 A | 2/2013 |
| JP | 2013209510 A | 10/2013 |
| JP | 2014043071 A | 3/2016 |
| WO | 2004048435 A | 10/2004 |
| WO | 2013049966 A1 | 4/2013 |
| WO | 2014067865 A1 | 5/2014 |
| WO | 2014120767 A1 | 8/2014 |

\* cited by examiner

PROCESS FOR MANUFACTURING A FIBER REINFORCED COMPOSITE ARTICLE, THE COMPOSITE ARTICLE OBTAINED AND THE USE THEREOF

CROSS-REFERENCE TO RELATED APPLICATIONS

This application is the National Phase of International Application PCT/EP2016/052330 filed Feb. 4, 2016 which designated the U.S. and which claims priority to European App. Serial No. 15156848.2 filed Feb. 27, 2015. The noted applications are incorporated herein by reference.

FIELD OF THE INVENTION

The present invention relates to a process for manufacturing a fiber reinforced composite article by applying a multiple component thermosetting resin composition in accordance with the features of the inventive process, which facilitates manufacturing of composite articles with reduced cycle times. The composite articles obtained exhibit high fibre content, low void content and excellent mechanical properties, and can be used for the construction of mass transportation vehicles, in particular in automotive and aerospace industry.

BACKGROUND OF THE INVENTION

Significant effort in automotive industry is put into the production of lightweight cars to reduce $CO_2$-emission. One effort comprises complete or partial replacement of steel by aluminium. Another effort is replacement of aluminium or steel by composites, which further reduces the weight of cars. However, manufacturing composite body or even chassis parts for cars is demanding as only a few methods are suitable for making complex three-dimensional composite structures. As is the case with many other manufacturing processes, the economics of these composite manufacturing processes is heavily dependent on operating rates. For molding processes, operating rates are often expressed in terms of "cycle time". "Cycle time" represents the time required to produce a part on the mold and prepare the mold to make the next part. Cycle time directly affects the number of parts that can be made on a mold per unit time. Longer cycle times increase manufacturing costs because overhead costs, for example, facilities and labor, are greater per part produced. If greater production capacity is needed, capital costs are also increased, due to the need for more molds and other processing equipment. In order to become competitive with other solutions, cycle times need to be shortened Manufacture of composite parts with very short cycle times is already well known by compression molding of SMC (sheet molding compound) and BMC (bulk molding compound). In these processes, the molding compound is compressed in a heated, closed mold cavity until cured, after which it is demolded. The high viscosity of the molding compound enables high pressures to be generated during closure of the mold, which ensures that the material is fully distributed throughout the cavity and is fully consolidated. The mold cavity is normally closed using a line of striction (pinch-off section) at the edge of the part—i.e. a periphery area where the thickness is much reduced compared to the part thickness. When the molding compound reaches the line of striction, its viscosity is sufficiently high that the material is substantially prevented from passing. Molding compounds suitable for this process are prepared prior to molding and are typically a mixture of thermoset resin, a suitable curing agent, a chopped fibre reinforcement (typically glass or carbon fibre) and mineral fillers such as magnesium oxide or calcium carbonate. Mineral fillers are primarily added to increase the viscosity of the compound to make is suitable for the molding process, as well as reducing the cost of the material. The fibre volume content of SMC and BMC compounds is rather low (less than 50%, typically in the order of 20 to 30%) and additionally fibre length is often short (less than 50 mm). Since the properties of a composite material depend largely on the strength and orientation of the fibre reinforcement, mechanical performance of parts made using these processes is therefore also low. Non-optimal fibre orientation induced by flow during the molding process further reduces mechanical performance. Weight of parts made with this material is typically high due to the high density of the mineral fillers necessary to achieve the high viscosity of the molding compound.

High-performance thermoset resin systems such as those based on epoxy, vinyl ester, polyurethane and polyester resins are well known and are used with carbon and glass fibre or other high-strength fibre reinforcements to produce composite parts exhibiting exceptional strength and very light weight. High fibre volume content and the absence of mineral fillers both contribute to make parts with high strength and low weight.

High performance resins such as epoxy resins may be pre-mixed with suitable latent hardeners and applied to the fibre reinforcement prior to the molding process to make what is commonly referred to as a prepreg. These resins are commonly solid or semi-solid materials, such that the resulting prepreg may be conveniently handled and molded. Molding occurs at elevated temperature in order to reduce the viscosity of the resin and activate the latent hardener, typically in a press or autoclave in order to exert pressure and thus consolidate the part. The volume fraction of reinforcing fibre in composites made from prepreg materials may be as high as 60-65%, leading to exceptionally high mechanical properties. However, the preparation of the prepreg material is an additional production step, and the instability of the resin/hardener admixture typically requires cold storage of the material prior to molding. Furthermore, the latency of the hardener required in order to achieve suitable storage stability tends to make the curing time of this material rather long during the molding process. All of this adds cost to the manufacturing process.

Low viscosity liquid thermoset resins may be used to prepare composite parts by mixing with a suitable curing agent and directly impregnating the dry fibre reinforcement during the molding process. This process facilitates production of light weight and high strength parts of high fibre volume fraction, without the additional cost associated with the preperg process. However, low viscosity resins are unsuitable for use in the SMC/BMC compression molding process, since this process relies on the high viscosity of the molding compound to achieve the necessary mold pressure to fully consolidate the part and to prevent leakage from the mold.

The resin transfer molding (RTM) process has been demonstrated to produce composite parts of excellent quality from high-performance liquid resins (low void content, low surface defects, high mechanical properties). In this process, the fibre reinforcement is placed in a closed mold cavity, which may optionally be evacuated. Resin is then injected into the fibre via an injection gate to impregnate the fibre reinforcement and fill the mold. However, resin injection of the fibre reinforcement occurs predominantly in the plane of the reinforcing fabrics and thus the injection time can be very long depending on part size and the permeability of the fibre reinforcement. Practically, the fibre reinforcement permeability limits the volume fraction of fibre in the final composite, since increasing fibre volume fraction dramatically decreases permeability and therefore lengthens injection time. For high-volume production where cycle time is an important consideration, fibre volume fractions in excess of 55% are usually impractical using the RTM process due to the long injection times. The relatively long injection time of parts made with the RTM process requires resin systems which remain liquid throughout the injection step. Decreasing the reactivity of the resin system to ensure that it remains liquid throughout injection normally leads to a correspondingly longer cure time before the part can be demolded. Production cycle times are therefore longer for the RTM process than for compression molding.

Process variants of RTM are, for example, high-pressure resin transfer molding (HP-RTM) and high-pressure compression resin transfer molding (HP-CRTM).

In case of HP-RTM the reactive resin system is injected at high pressure (typically 50 to 150 bar) through the fibre stack in the closed mold cavity, onto which vacuum pressure is typically applied. The mold is normally placed in a heavy vertical press in order to prevent the mold from opening under the high injection pressure. Pressure is applied until gelation of the material occurs, which compensates for resin shrinkage occurring during curing. Injection directly onto the fibre stack may cause movement and misalignment of fibres, known as fibre wash, which can lead to reduced mechanical properties of the composite part. In order to minimise this effect, it is normal practice to partially bond the fibre stack in a process known as preforming. However, use of preformed fibres adds an additional manufacturing step and therefore additional costs.

HP-CRTM is similar to HP-RTM except that the resin is injected into a partially open mold cavity (also known as gap RTM, where the gap is of the order 0.1 to 2 mm). A partially open mold increases permeability of the fibre stack and thus reduces injection time. Upon injection, the mold is fully closed using a vertical press. HP-CRTM requires a compressible mold seal which extends some distance above the die face. The seal enables the mold to be sealed in a partially open position, and must be further compressed in order to fully close the mold cavity. Compression of this seal requires a higher force (and therefore heavier presses) than the HP-RTM described above. Whilst this process can decrease the injection time compared to standard HP-RTM, fibre impregnation is still typically longer than for compression molding, and additionally fibre movement (fibre wash) is significantly increased, since the partially open mold exerts little holding pressure on the fibres during injection.

Liquid compression molding wherein liquid resin is placed into a mold cavity with the fibre reinforcement and the mold cavity is subsequently closed, is also known to produce composite parts with very short cycle times. The resin is typically applied over the surface of the dry fibre reinforcement prior to mold closure, and thus when the mold is closed, impregnation is predominantly through-thickness of the reinforcing fabrics, making it considerably faster than for RTM, where impregnation is in-plane of the fibre reinforcement. However, composite quality is normally compromised compared to the RTM process due to the inclusion of entrapped air bubbles when the mold cavity is closed. Parts often display high void content and surface defects, which may make them unsuitable in applications where mechanical performance and/or visual quality are important factors. Another disadvantage compared to RTM is that liquid compression molding relies substantially on the mechanical compaction pressure to achieve complete fibre impregnation upon closure of the mold cavity. Since mechanical pressure is highest in mold planes perpendicular to press closure, but reducing to zero for mold planes aligned to the press closure axis, little mechanical pressure is applied to those areas largely aligned to the press axis. Part production is therefore limited to essentially flat parts, since areas of deep draw created by three dimensional part geometries do not receive sufficient mechanical pressure during mold closure to achieve proper impregnation of the fibre reinforcement. Deep-draw refers to areas of the mold cavity which are substantially aligned to the mold closure axis. In this process it is common practice to oversize the part dimensions in order to enable entrapped air bubbles to be pushed into the periphery (waste) area of the part, or to incorporate excess resin channels at the edge of the part for the same purpose. These peripheral areas need to be removed by trimming the part to its final dimensions which leads to a high wastage of resin and fibres. It is not uncommon to have 50 to 100% resin and fibre excess wastage on each part. Since the mold is not sealed, pressure in the mold cavity remains low and no compensation of resin shrinkage is possible. Part geometry is limited to substantially flat parts due to the mechanical pressure required for fibre impregnation.

In vacuum assisted liquid compression molding the process is as described above, but the compression mold is placed into a vacuum chamber and vacuum is applied prior to fully closing the mold. Whilst this process solves some of the issues associated with liquid compression molding (less wastage, reduced porosity), part geometry is still limited to substantially flat parts. Moreover, due to the size of an external vacuum chamber, the time required to evacuate to a pressure suitable to produce high quality parts necessarily lengthens the cycle time. Also, the overall vacuum level consistently achievable in an external vacuum chamber may be limited by mechanical design of the vacuum seal, compromising the final part quality.

The processes for the preparation of fiber reinforced composite articles available today which are useful, for example, for the production of lightweight vehicles, still have some disadvantages in respect of either the quality of the composite parts, i.e. the mechanical properties do not meet the specifications required, and/or the parts cannot be produced at sufficiently short cycle times. Also the visual appearance may be poor and therefore does not satisfy expectations set today in the automotive industry. Accordingly, there is still a need for an improved process which facilitates manufacturing of composite articles with reduced cycle times, wherein the composite articles exhibit high fibre content, low void content and excellent mechanical properties, for example tensile strength and modulus, and can be used for the construction of mass transportation vehicles, in particular in automotive and aerospace industry.

BRIEF DESCRIPTION OF THE DRAWINGS

FIG. 1 depicts the mold in a partially closed position, wherein the vacuum seal (15) is in contact with the vertically extending wall of the lower die (14).

FIG. 2 depicts the mold in a completely closed position, whereby the vacuum seal (15) effectively closes the mold cavity, and the resin retention seal (15b) prevents the resin from leaking.

FIG. 3a depicts the mold in a partially closed position, wherein the vacuum seal (15) and the additional seal (15b), the resin stripping seal, is in contact with the vertically extending walls of the lower die (14). In this partially closed position the mold cavity (17) can be effectively evacuated through an appropriately placed vacuum outlet. FIG. 3b depicts the mold in a completely closed position. To improve vacuum-tightness, the vertically extending walls (14) of the lower die may be inclined at an angle of a few degrees (18), for example, of from 1 to 3 degrees, so that the seal (15b) is compressed further.

FIG. 4 depicts the mold in a completely closed position, which is the embodiment of FIG. 3b in scaled-up illustration. An angled geometry of constant thickness (19) enables easy demold of a composite article with no thin cured resin flash. The inclination of the vertically extending walls (14) can either be (i) locally across a certain limited area (18) as shown in the embodiment of FIG. 4, or (ii) across the entire length of the walls (14) from top to bottom. In the latter case (ii), the inclination angle is appropriately smaller than in the first case (i).

DETAILED DESCRIPTION

Accordingly, the present invention relates to a process for the preparation of a fiber reinforced composite article comprising the steps of
a) providing a mold, comprising an upper die (11) and a lower die (12), the lower die (12) having a molding surface and vertically extending side walls (14), the upper die (11) having a complementary molding surface and vertically extending side walls (13) substantially aligned with the side walls of the lower die, so that the upper die vertically moves into the lower die to form a cavity (17) in a partially and completely closed position of the mold, wherein the cavity (17) in a partially closed position is sealed vacuum-tight by at least one seal (15) placed around the vertically extending walls of the upper die (11), or the lower die (12), horizontally to the moving direction of the upper die (11), and wherein the at least one seal (15) also works as a resin retention seal which prevents the resin from leaking,
b) applying a thermosetting resin composition onto a fibre reinforcement, and placing the thus treated fibre reinforcement into the lower die of the mold (12), or
c) placing a fibre reinforcement into the lower die of the mold (12), and applying a thermosetting resin composition onto the fibre reinforcement
d) moving the upper die (11) into the lower die (12) and partially closing the mold,
e) evacuating the mold in the partially closed position by means of a vacuum outlet to a pressure of from 0.1 to 100 mbar,
f) completely closing the mold and exerting an hydraulic pressure of from 2 to 100 bar onto the resin treated reinforcement to complete impregnation of the fibre reinforcement,
g) curing the resin impregnated reinforcement,
h) demolding the cured composite article.

The process according to the present invention is suitable for the processing of thermosetting resin compositions which are liquid at the molding temperature, in particular, liquid resin compositions which have a low viscosity at the molding temperature. In a certain embodiment the viscosity of the thermosetting liquid resin compositions is of from 0.1 to 10,000 mPa·s, preferably, of from 0.1 to 100 mPa·s at the molding temperature.

Low viscosity resins can advantageously be used for the preparation of composite articles with a fibre volume fraction of 50% or more based on the total volume of the composite article (fibre+resin), because resins of a lower viscosity more easily penetrate into the interfibrous space of the dry reinforcement compared to resins of a higher viscosity. In one embodiment the fibre volume fraction of the composite article prepared by the inventive process is in the range of 50 to 60% based on the total volume of the composite article. In another embodiment the fibre volume fraction of the composite article prepared by the inventive process is in the range of 60 to 70% based on the total volume of the composite article.

In a preferred embodiment of the present invention the mold in the partially closed position in step e) is evacuated to a pressure of from 0.1 to 50 mbar, especially of from 0.1 to 10 mbar.

In a preferred embodiment of the present invention the hydraulic pressure exerted onto the resin impregnated reinforcement in step f) is of from 2 to 75 bar, especially of from 10 to 50 bar. Hydraulic pressure in the context of the present invention means the pressure in the liquid resin, when press force is applied.

The process of the present invention is essentially distinguished from RTM, such as HP-RTM, by step b) or c), which step omits injection of the resin at high pressure through the fibre stack in the closed mold.

WO2014/067865 discloses a mold for resin transfer molding (RTM). As indicated above, and in contrast to the present invention, RTM is carried out by injecting the resin directly into the fibre preform placed in the closed mold cavity to impregnate the fibre reinforcement and fill the mold. In contrast, impregnation of the fibre reinforcement by the process of the present invention is carried out by omitting an injection step, but wetting the surface of the fibre reinforcement with the resin composition, either separately and out of the mold in accordance with step b), or by placing the fibre reinforcement into the lower die of the mold (12). Since resin impregnation of the fibre stack in case of the present invention occurs predominantly through-thickness, fibre movement as observed in RTM is largely eliminated by this configuration. Moreover, the process of the present invention allows for a less sophisticated machine set-up to be applied, since the closed mold does not have to resist the high injection pressure of the resin, i.e. heavy vertical presses to prevent the mold cavity from opening at high injection pressure are not required.

In accordance with step b) of the present invention, the preparation of the resin treated fibre reinforcement can be carried out separately and independently from steps d) to h), i.e. the molding and demolding of the reinforced article.

Advantageously, wetting of the fibre reinforcement is carried out in an automated process, for example, by processes which allow for the wetting of the fibrous reinforcement with the resin onto its surface, for example, dosing, pouring, casting, curtain coating, roller coating or spray application. Such processes are known per se to someone of ordinary skill, for example in the field of textile fibre processing.

Wetting according to step b), which is a preferred embodiment, is advantageously synchronized with the molding and demolding steps d) to h), so that step b) provides the resin treated fibre reinforcement just in time to be available immediately for use in steps d) to h).

The inventive process enables processing of unbonded fibre reinforcement fabrics. Preparation of a partially-bonded fibre preform, which adds another process step as disclosed in WO2014/067865, may be omitted, since fibre misalignment upon resin impregnation is eliminated. Moreover, an internal seal in the fibre preform to avoid leakage of excess resin to contaminate the mold as depicted in FIG. 1 of WO2014/067865 can be omitted. The mold assembly used in accordance with the process of the present invention provides at least one seal, which also works as a resin retention seal and prevents the resin from leaking, thus allowing for build up of homogeneous pressure over the entire composite part.

The mold assembly comprises an upper and a lower die with vertically extending side walls (13) and (14) and a seal assembly as indicated above which come together to form a closed mold cavity. A vacuum outlet is included either in the upper die (11), or alternatively, in the lower die (12), to allow evacuation of the mold cavity in a partially closed position, with closure of the vacuum outlet occurring prior to full mold closure.

Figure 1:
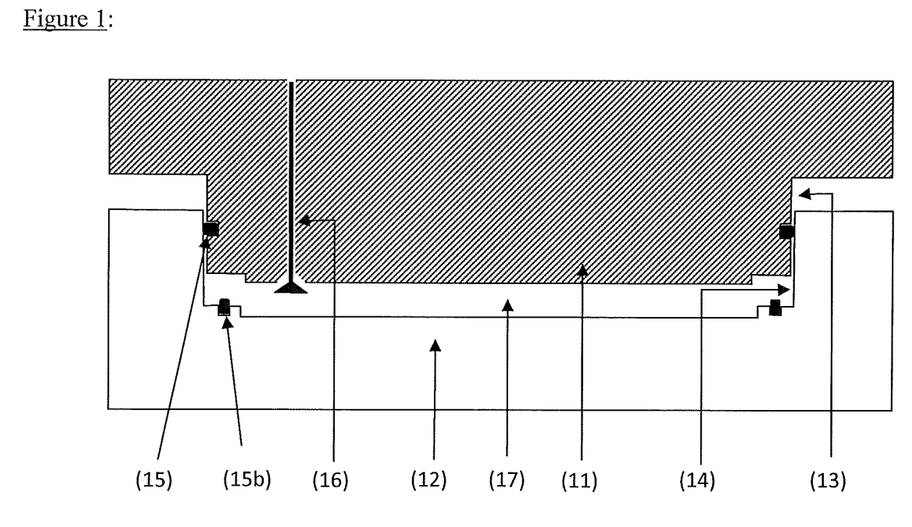
FIGS. 1 and 2 show an example of the mold used in accordance with the present invention comprising an upper die (11) and lower die (12) forming a mold cavity (17) and vertically extended walls (13) and (14) with a seal (15) to create an internal vacuum chamber and additional seal (15b) to retain the liquid resin.
Figure 2:
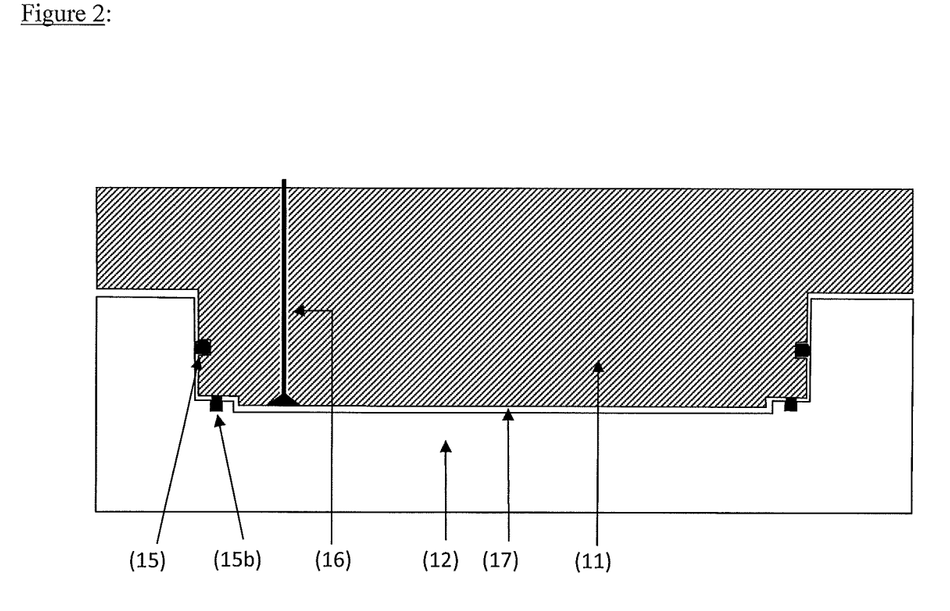

In a certain embodiment of the inventive process, a vacuum outlet is included in the upper die (11), as shown in FIGS. 1 and 2. In this embodiment, the vacuum outlet (16) is suitably sealed by a valve. In FIG. 1, depicting the mold in a partially closed position in accordance with step d) of the inventive process, the vacuum outlet is open, and the mold is ready to be evacuated in accordance with step e). In FIG. 2, depicting the mold in a completely closed position in accordance with step f) of the inventive process, the vacuum outlet is closed, and the mold is ready for a hydraulic pressure to be exerted onto the resin treated fibre reinforcement to impregnate the fibre reinforcement.

In another embodiment of the inventive process, a vacuum outlet is included in the lower die (12), as shown, for example, in FIG. 2 of WO2014/067865.

In vacuum assisted liquid compression molding an external vacuum chamber is normally constructed around the mold. External vacuum chambers are generally bulky and the vacuum which can be achieved may be insufficient to enable for the production of high quality composite articles with visual appearance or surface quality free of any defects.

In order to provide for vacuum-tightness of the mold in its partially closed or closed position, at least one gasket/seal (15) is placed around the vertically extending walls of the upper die (11), or the lower die (12), horizontally to the moving direction of the upper die (11). In one embodiment the seal is endless, for example, an O-ring. Other seal configurations/geometries are possible, for example, a square, a rectangular, or a hexagonal shape, corresponding to the cross-sectional shape of the upper die (11), or the lower die (12), perpendicular to the moving direction of the upper die (11) into the lower die (12). Appropriately, the cross-sectional shape of the upper and lower die will be determined by the shape of the composite article to be manufactured. Moreover, the at least one seal enables substantial positive pressure (>10 bars) to be generated in step f) upon complete mold closure.

In one embodiment of the present invention the at least one seal is a rubbery-elastic, compressible material, for example, a silicone rubber, a polyurethane rubber, a polyacrylate- or polymethacrylate rubber, or a polybutadiene rubber, or a mixture of at least two polymers of the aforementioned group of polymers.

Figure 3A:
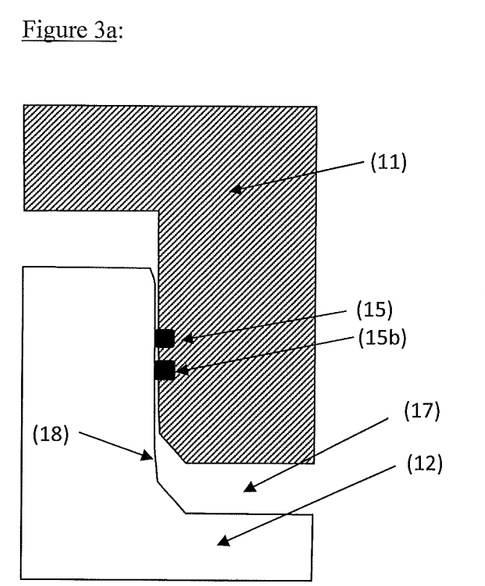
FIG. 3a and FIG. 3b depict the detailed view of another embodiment, wherein the additional seal (15b) is placed around the vertically extending walls of the upper die (11).
Figure 3B:
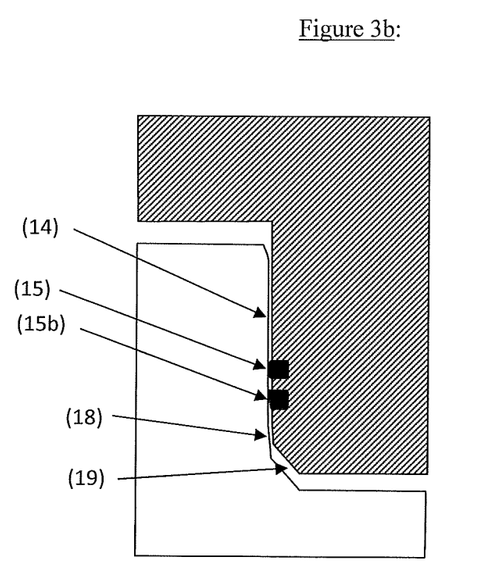
Figure 4:
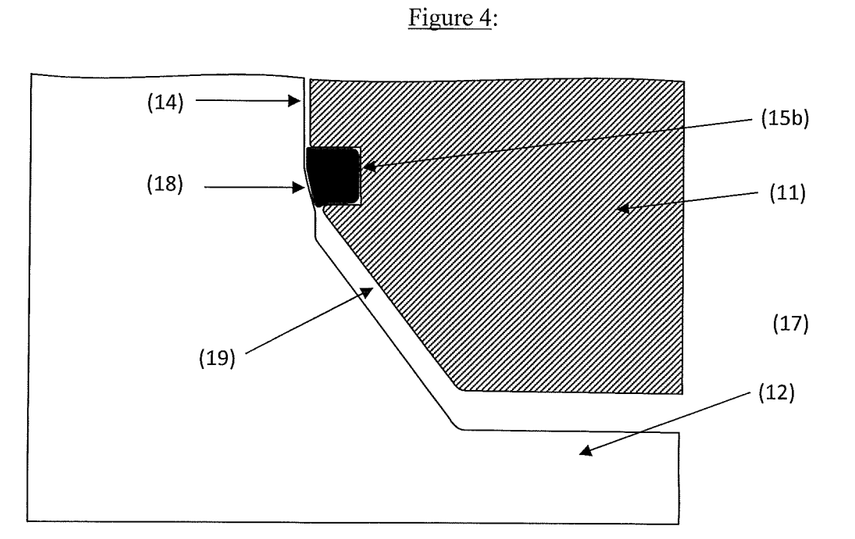

In one embodiment two seals (15) and (15b), as shown in FIG. 3a and FIG. 3b, are placed around the vertically extending walls of the upper die (11) horizontally to its moving direction. A two seal configuration generally improves vacuum-tightness. In another embodiment, three seals, which further improve vacuum tightness, are placed around the vertically extending walls of the upper die (11) horizontally to its moving direction. In yet another embodiment, two seals are placed around the vertically extending walls of the lower die (12) horizontally to the moving direction of the upper die (11). The two or three seals may be aligned parallel to each other. In case of two or three seals, the seal being closest to the mold cavity serves as the resin stripping seal, and protects the other seal or seals, which provide for vacuum-tightness, from being contaminated by leaked resin. Since a seal assembly consisting of at least two seals, one vacuum seal and one resin stripping seal, protects the vacuum seal from being contaminated, even after repeated mold cycles, the need for cleaning operations between cycles is largely eliminated, making it highly suited to high-volume production. Alternatively, the seal preventing leaked resin from contaminating the vacuum seal may be placed in the lower die (12), for example, in the peripheral section of the lower die's cavity, as shown in the embodiment of FIGS. 1 and 2 (15b). In accordance with this embodiment, the seal (15b) is more appropriately designated a resin retention seal.

The process according to the present invention provides for very short mold evacuation times compared to an external vacuum chamber due to the small volume of the mold cavity in the partially closed position, thus enabling very short production cycle times, since fast mold evacuation prior to full mold closure enables use of short gel time resin systems, with correspondingly shorter cure times.

When processing low viscosity liquid resins, a line of striction (pinch-off section) in the peripheral area of the mold cavity, as known from the processing of more viscous resin compositions by compression molding, will hardly prevent low viscosity resin from passing the line of striction and escaping into the peripheral sections of the mold. This solution is therefore not feasible for industrial processing of low-viscosity liquid resins. However, an internal vertical sliding vacuum chamber with integral sliding seal(s) as realized by the process according to the present invention, in particular the use of a two seal assembly, one vacuum seal and one resin stripping or resin retention seal, renders this process highly suitable for use with low-viscosity liquid resin systems and allows for the production of parts of surprisingly high quality (low void content, high fibre volume content, low surface defects) with very short production cycle times.

The use of two or more seals described in this invention prevents liquid resin from contaminating the vacuum seal, thus allowing vacuum levels of 10 mbar or less to be consistently and reliably achieved, so that composite parts produced are void free and display very high visual quality and mechanical performance.

Full mold closure occurs when the entire mold cavity is filled, i.e. there are no mechanical stops, so the mold continues to close until pressure is exerted on the liquid resin. The seal assembly enables significant pressure to be generated in the mold cavity without any leakage. Hydraulic pressure is generated inside the mold when the press force is applied to the liquid resin contained in the sealed cavity. The pressure generated may be conveniently measured by use of pressure sensors in the mold cavity, such as are known in the art, to control the press force applied. Pressures in the range of 2 to 100 bar, more typically 20 to 50 bar are generated in order to ensure a fully impregnated, void-free composite part.

The positive hydraulic pressure generated following mold closure enables the fibre reinforcement to be fully impregnated even when deep-draw parts are made offering a significant advantage compared to traditional liquid compression molding. Furthermore, the positive pressure can be maintained throughout curing of the part in order to compensate any shrinkage of the liquid resin, further increasing part quality.

The process according to the present invention is useful to form various types of composite products, and provides several advantages. Cure times tend to be very short, with good development of polymer properties, such as glass transition temperature Tg.

Examples of thermosetting resins which may be used with the present invention are polyester, vinyl ester, epoxy, polyurethane, polyurea, polyisocyanurate, phenol-formaldehyde, melamine, polyimide, benzoxazine, cyanate ester, bismaleimide and acrylic resins, such as those described by Fink, Reactive Polymers Fundamentals and Applications, PDL (2013).

In a preferred embodiment, the thermosetting resin composition used in accordance with the process of the present invention is an epoxy resin composition.

The epoxy resin (A) used herein comprises at least one compound or mixture of compounds having an average functionality of at least 2.0 epoxide groups per molecule. The epoxy resin or mixture thereof may have an average of up to 4.0 epoxide groups per molecule. It preferably has an average of from 2.0 to 3.0 epoxide groups per molecule.

The epoxy resin may have an epoxy equivalent weight of about 150 to about 1,000, preferably about 160 to about 300, more preferably from about 170 to about 250. If the epoxy resin is halogenated, the equivalent weight may be somewhat higher.

Epoxide resins which may be used include polyglycidyl and poly(β-methylglycidyl) ethers obtainable by the reaction of substances containing per molecule, two or more alcoholic hydroxyl groups, or two or more phenolic hydroxyl groups, with epichlorohydrin, glycerol dichlorohydrin, or β-methylepichlorohydrin, under alkaline conditions or, alternatively, in the presence of an acidic catalyst with subsequent treatment with alkali.

Such polyglycidyl ethers may be derived from aliphatic alcohols, for example, ethylene glycol and poly(oxyethylene)glycols such as diethylene glycol and triethylene glycol, propylene glycol and poly(oxypropylene)glycols, propane-1,3-diol, butane-1,4-diol, pentane-1,5-diol, hexane-1,6-diol, hexane-2,4,6-triol, glycerol, 1,1,1-trimethylolpropane, and pentaerythritol; from cycloaliphatic alcohols, such as quinitol, 1,1 bis(hydroxymethyl)cyclohex-3-ene, bis(4-hydroxycyclohexyl)methane, and 2,2-bis(4-hydroxycyclohexyl)propane; or from alcohols containing aromatic nuclei, such as N,N-bis-(2-hydroxyethyl)aniline and 4,4'-bis(2-hydroxyethylamino)diphenylmethane.

Preferably the polyglycidyl ethers are derived from substances containing two or more phenolic hydroxyl groups per molecule, for example, resorcinol, catechol, hydroquinone, bis(4-hydroxyphenyl)methane (bisphenol F), 1,1,2,2-tetrakis(4-hydroxyphenyl)ethane, 4,4'-dihydroxydiphenyl, bis(4-hydroxyphenyl)sulphone (bisphenol S), 1,1-bis(4-hydroxylphenyl)-1-phenyl ethane (bisphenol AP), 1,1-bis(4-hydroxylphenyl)ethylene (bisphenol AD), phenol-formaldehyde or cresol-formaldehyde novolac resins, 2,2-bis(4-hydroxyphenyl)propane (bisphenol A), and 2,2-bis(3,5-dibromo-4-hydroxyphenyl)propane.

There may further be employed poly(N-glycidyl) compounds, such as are, for example, obtained by the dehydrochlorination of the reaction products of epichlorohydrin and amines containing at least two hydrogen atoms directly attached to nitrogen, such as aniline, n-butylamine, bis(4-aminophenyl)methane, bis(4-aminophenyl)sulphone, and bis(4-methylaminophenyl)methane. Other poly(N-glycidyl) compounds that may be used include triglycidyl isocyanurate, N,N'-diglycidyl derivatives of cyclic alkylene ureas such as ethyleneurea and 1,3-propyleneurea, and N,N'-diglycidyl derivatives of hydantoins such as 5,5-dimethylhydantoin.

Epoxide resins obtained by the epoxidation of cyclic and acrylic polyolefins may also be employed, such as vinylcyclohexene dioxide, limonene dioxide, dicyclopentadiene dioxide, 3,4-epoxydihydrodicyclopentadienyl glycidyl ether, the bis(3,4-epoxydihydrodicyclopenta-dienyl)ether of ethylene glycol, 3,4-epoxycyclohexylmethyl 3,4'-epoxycyclohexanecarboxylate and its 6,6'-dimethyl derivative, the bis(3,4-epoxycyclohexanecarboxylate) of ethylene glycol, the acetal formed between 3,4-epoxycyclohexanecarboxyaldehyde and 1,1-bis(hydroxymethyl)-3,4-epoxycyclohexane, bis(2,3-epoxycyclopentyl)ether, and epoxidized butadiene or copolymers of butadiene with ethylenic compounds such as styrene and vinyl acetate.

In one embodiment of the present invention, the epoxy resin (A) is the diglycidyl ether of a polyhydric phenol represented by formula (1)

(1)

wherein $(R_1)_m$ independently denotes m substituents selected from the group consisting of $C_1$-$C_4$alkyl and halogen, $(R_2)_n$ independently denotes n substituents selected from the group consisting of $C_1$-$C_4$alkyl and halogen, each B independently is —S—, —S—S—, —SO—, —SO$_2$—, —CO$_3$—, —CO—, —O—, or a $C_1$-$C_6$(cylo)alkylene radical. Each m and each n are independently an integer 0, 1, 2, 3 or 4 and q is a number of from 0 to 5. q is the average number of hydroxyl groups in the epoxy resin of formula (1). $R_1$ and $R_2$ in the meaning of halogen are, for example, chlorine or bromine. $R_1$ and $R_2$ in the meaning of $C_1$-$C_4$alkyl are, for example, methyl, ethyl, n-propyl or iso-propyl. B independently in the meaning of a $C_1$-$C_6$(cylo)-alkylene radical is, for example, methylene, 1,2-ethylene, 1,3-propylene, 1,2-propylene, 2,2-propylene, 1,4-butylene, 1,5-pentylene, 1,6-hexylene or 1,1-cyclohexylene. Preferably, each B independently is methylene, 2,2-propylene or —$SO_2$—. Preferably, each m and each n are independently an integer 0, 1 or 2, more preferably 0. Examples of suitable epoxy resins include diglycidyl ethers of dihydric phenols such as bisphenol A, bisphenol F and bisphenol S, and mixtures thereof. Epoxy resins of this type are commercially available, including diglycidyl ethers of bisphenol A resins. Suitable halogenated epoxy resins, wherein at least one of $R_1$ and $R_2$ are halogen, are described in, for example, in U.S. Pat. Nos. 4,251,594, 4,661,568, 4,713,137 and 4,868,059, and Lee and Neville, Handbook of Epoxy Resins, McGraw-Hill (1982), all of which are incorporated herein by reference.

The epoxy resins indicated are either commercially available or can be prepared according to the processes described in the cited documents.

In a preferred embodiment of the present invention diglycidyl ethers of polyhydric phenols as given by formula (1) are used, wherein the radicals have the meanings and preferences given above. Especially, the epoxy resin (A) is the diglycidyl ether of bisphenol A or bisphenol F.

If required, the viscosity of the epoxy resin composition can be adjusted by adding an epoxy diluent component. The epoxy diluent component is, for example, a glycidyl terminated compound. Especially preferred are compounds containing a glycidyl or β-methylglycidyl groups directly attached to an atom of oxygen, nitrogen, or sulfur. Such resins include polyglycidyl and poly(β-methylglycidyl) esters obtainable by the reaction of a substance containing two or more carboxylic acid groups per molecule with epichlorohydrin, glycerol dichlorohydrin, or β-methyl-epichlorohydrin in the presence of alkali. The polyglycidyl esters may be derived from aliphatic carboxylic acids, e.g. oxalic acid, succinic acid, adipic acid, sebacic acid, or dimerised or trimerised linoleic acid, from cycloaliphatic carboxylic acids such as hexahydro-phthalic, 4-methylhexahydrophthalic, tetrahydrophthalic, and 4-methyltetrahydrophthalic acid, or from aromatic carboxylic acids, such as phthalic acid, isophthalic acid, and terephthalic acid.

The thermosetting epoxy resin composition further comprises a curing agent (B). According to the process of the present invention there come into consideration as the curing agent (B) amines, for example, primary or secondary amines, acids and acid-anhydrides, lewis acids, lewis bases, phenols. The identity of many of these curing agents and their curing mechanisms are discussed in Lee and Neville, Handbook of Epoxy Resins, McGraw-Hill (1982).

Particularly suited to the present invention are amines, of which there may be mentioned aliphatic, cycloaliphatic or araliphatic primary and secondary amines, including mixtures of these amines. Typical amines include monoethanolamine, N-aminoethyl ethanolamine, ethylenediamine, hexamethylenediamine, trimethylhexamethylenediamines, methylpentamethylenediamines, diethylenetriamine, triethylenetetramine, tetraethylenepentamine, N,N-dimethylpropylenediamine-1,3, N,N-diethylpropylenediamine-1,3, bis(4-amino-3-methylcyclohexyl)methane, bis(p-aminocyclohexyl)methane, 2,2-bis-(4-aminocyclohexyl)propane, 3,5,5-trimethyl-s-(aminomethyl)cyclohexylamine, 1,2-diaminocyclohexane, 1,4-diaminocyclohexane, 1,3-bis(aminomethyl)cyclohexane, 1,4-bis(aminomethyl)cyclohexane, N-aminoethylpiperazine, m-xylene diamine, norbornene diamine, 3(4),8(9)-bis-(aminomethyl)-tricyclo-[5.2.1.02,6]decane (TCD-diamine), and isophorone diamine. Preferred amines include 2,2,4-trimethylhexamethylenediamine, 2,4,4-trimethylhexamethylenediamine, 2-methylpentamethylenediamine, diethylenetriamine, triethylenetetramine, tetraethylenepentamine, 1,2-diaminocyclohexane, bis(p-aminocyclohexyl)methane, m-xylene diamine, norbornene diamine, 3(4),8(9)-bis-(aminomethyl)-tricyclo-[5.2.1.02,6]decane (TCD-diamine), isophorone diamine 1,3-bis(aminomethyl)cyclohexane, and 1,4-bis(aminomethyl)cyclohexane. Especially preferred amines include diethylenetriamine, triethylenetetramine, tetraethylenepentamine, 1,2-diaminocyclohexane, m-xylene diamine, 1,3-bis(aminomethyl)cyclohexane, and isophorone diamine.

According to the process of the present invention the curing agent (B) may be used in combination with an accelerator (C) to adjust the curing rate of the thermosetting resin composition. Suitable accelerators for use with epoxy-amine compositions are well described and include alcohols, phenols, acids, tertiary amines, guanidines, boron halide complexes, imidazoles and inorganic metal salts such as calcium nitrate.

According to the process of the present invention, curing step g), i.e. curing of the resin impregnated reinforcement, is carried out under, for example, isothermal conditions at a temperature of from 50 to 200° C., preferably of from 100 to 150° C.

The process according to the present invention allows for the preparation of fibre reinforced composite articles with excellent mechanical properties, such as elongation, fracture toughness, tensile strength and modulus, within a cycle time of less than 10 minutes, preferably less than 5 minutes and most preferably less than 2 minutes. The resin composition applied according to inventive process has an appropriate open time after mixing of the components, but the ability to cure rapidly without the need of post-curing.

The inventive process allows for homogeneous pressure applied over the entire composite part, thereby reduces the size of bubbles also in its peripheral sections, and thus improves the visual appearance of the final composite part. Bubbles are generated by entrapped air and water adsorbed to the fiber reinforcement. In case no resin retention seal is present, the hydraulic pressure of the liquid resin decreases from the center of the composite part to its peripheral area.

The present invention is also directed to the composite articles obtained by the inventive process.

Moreover, the present invention is directed to the use of the composite articles obtained according to the inventive process for the construction of consumer goods, such as computer cases or luggage cases, or in the construction of mass transportation vehicles, in particular, in the automotive and aerospace industry.

The following serves to further illustrate the invention. Unless otherwise indicated, the temperatures are given in degrees Celsius, parts are parts by weight and percentages relate to % by weight. Parts by weight relate to parts by volume in a ratio of kilograms to litres.

1. A carbon fibre reinforcement fabric (Hexforce 48300/Hexforce MBB00, Hexcel, Stamford, US) is cut to size and piled in a stack. Binders may optionally be applied to the single fabrics to improve handling of the fabric layers during cutting and placement.

2. A predetermined, measured amount of the thermosetting resin composition containing 100 parts of ARALDITE® LY 3585 (an epoxy resin available from Huntsman Corporation), 21 parts of ARADUR® 3475 (a curing agent available from Huntsman Corporation), and 2 parts of Evomold 3202 (a release agent available from KVS Eckert & Woelk GmbH) is applied to the fibre reinforcement stack and the fibre stack is placed into the lower die of the mold (12) depicted in FIG. 3a. In advance of being applied to the fibre reinforcement, the resin components are mixed by an automated mixing/dosing equipment.

3. The mold is partially closed, by moving the upper die (11) into the lower die (12), so that the seals (15) and (15b) placed around the vertically extending wall of the upper die (11), horizontally to its moving direction, are in contact with the vertically extending wall of the lower die (12) to form a vacuum tight cavity (see FIG. 3a).

4. The cavity formed by the mold in the partially closed position according to step 3 is evacuated to a pressure of 10 mbar or lower.

5. Once the required vacuum is achieved, the mold is fully closed (see FIG. 3b).

6. Press force is applied to the closed mold, such as to generate a positive hydraulic pressure onto the resin inside the mold. Mold pressure is increased up to 20 to 50 bars, which ensures complete impregnation of the fibre stack, even in areas where the cavity is partially or completely axially aligned to the press force (deep draw areas). Careful adjustment of the resin quantity and press force applied to the fibre stack ensures that the mold is completely filled and that sufficient pressure is generated during closure.

7. Press force is applied to the impregnated fibre reinforcement in the closed position of the mold for sufficient time that the resin system reacts and becomes cured. The mold is heated to a temperature of 140° C. prior to molding in order to reduce the time needed to cure the resin and the mold temperature is maintained at 140° C. for approximately 1 minute.

8. The mold is opened and the finished part is removed. Demolding of the finished part may be facilitated by use of mechanical or pneumatic ejectors, such as are know in the art, or by a combination of these.

TABLE 1

| Test data | | | |
|---|---|---|---|
| Properties of the thermosetting resin composition | | | |
| Viscosity | Cone-plate viscometer | 25° C. 140° C. | 1020 mPa · s <10 mPa · s |
| Gel time | Hot plate | 140° C. | 21 s |
| Properties of the composite prepared | | | |
| Composite laminate construction: 6 layers 300 g/m² carbon fibre fabric ±45°/0°/0°/0°/0°/±45° Laminate curing: 55 s at 140° C. | | | |
| Plate quality | Visual/ micrograph of cut and polished laminate section | Plate 1: Vf = 50% Plate 2: Vf = 60% Plate 3: Vf = 65% | No defects/no voids No defects/no voids No defects/no voids |
| Properties of Plate 1 (Vf = 50%) | | | |
| Glass transition temperature (Tg) | DMA ISO 6721 2° C./min | Tg onset Tg mid-point | 111° C. 126° C. |
| Interlaminar shear strength | ASTM D2344 | | 61 MPa |
| Impact resistance | Charpy ISO 179 | | 187 kJ/m² |

Vf: fibre volume fraction in composite article (plates 1 to 3); calculated from the part thickness together with weight of the resin composition and the fibre reinforcement fabric

What is claimed is:

1. A process for preparing a fiber reinforced composite article comprising the steps of:
   a) providing a mold, comprising an upper die (11) and a lower die (12), the lower die (12) having a molding surface and vertically extending side walls (14), the upper die (11) having a complementary molding surface and vertically extending side walls (13) substantially aligned with the side walls of the lower die (12), so that the upper die (11) vertically moves into the lower die (12) to form a cavity (17) in a partially closed position and a completely closed position of the mold, wherein the cavity (17) in a partially closed position is sealed vacuum-tight by at least one seal (15) placed around the vertically extending side walls (13) of the upper die (11) or the vertically extending side walls (14) of the lower die (12) and perpendicular to the direction of movement of the upper die (11), and wherein the at least one seal (15) works as a resin retention seal which prevents the resin from leaking,
   b) performing one of b1) applying a thermosetting resin composition onto a fibre reinforcement to form a treated fibre reinforcement, and placing the treated fibre reinforcement into the lower die (12) of the mold, or b2) placing a fibre reinforcement into the lower die (12) of the mold, and applying a thermosetting resin composition onto the fibre reinforcement while the mold is open,
   c) moving the upper die (11) into the lower die (12) and partially closing the mold,
   d) evacuating the mold in the partially closed position by means of a vacuum outlet to a pressure of from 0.1 to 100 mbar,
   e) completely closing the mold and exerting a hydraulic pressure of from 2 to 100 bar onto the resin treated fibre reinforcement to complete impregnation of the fibre reinforcement,
   f) curing the resin impregnated fibre reinforcement to form a cured fiber reinforced composite article, wherein the cured fibre reinforced composite article has a volume fraction of fibre of 50% to 70%, based on the total volume of fibre and resin in the composite article, and
   g) demolding the cured fiber reinforced composite article wherein the thermosetting resin composition is an epoxy resin composition comprising an epoxy resin, wherein the epoxy resin is the diglycidylether of bisphenol A or the diglycidylether of bisphenol F.

2. The process according to claim 1, wherein the mold in the partially closed position in step d) is evacuated to a pressure of from 0.1 to 50 mbar.

3. The process according to claim 1, wherein the hydraulic pressure exerted onto the resin treated fibre reinforcement in step e) is from 2 to 75 bar.

4. The process according to claim 1, wherein curing of the resin impregnated fibre reinforcement in step f) is carried out under isothermal conditions at a temperature of from 50 to 200° C.

5. The process according to claim 1, wherein at least two seals (15) and (15b) are placed around the vertically extending side walls (13) of the upper die (11) perpendicular to its direction of movement and are substantially aligned parallel to each other, in order to provide vacuum-tightness of the cavity (17) in partially closed and completely closed positions of the mold.

6. The process according to claim 1, wherein the thermosetting resin composition is liquid at the molding temperature.

7. The process according to claim 6, wherein the thermosetting resin composition has a viscosity of from 0.1 to 10,000 mPa·s at the molding temperature.

8. The process according to claim 1, wherein the mold in the partially closed position in step d) is evacuated to a pressure of from 0.1 to 10 mbar.

9. The process according to claim 1, wherein the hydraulic pressure exerted onto the resin treated reinforcement in step e) is from 10 to 50 bar.

10. The process according to claim 1, wherein curing of the resin impregnated fibre reinforcement in step f) is carried out under isothermal conditions at a temperature of from 100 to 150° C.

11. The process according to claim 6, wherein the thermosetting resin composition has a viscosity of from 0.1 to 100 mPa·s at the molding temperature.

* * * * *